United States Patent [19]

Anderman et al.

[11] Patent Number: 4,853,305

[45] Date of Patent: * Aug. 1, 1989

[54] CATHODIC ELECTRODE

[75] Inventors: Menahem Anderman, Boyds; Steven L. Johnson, Catonsville, both of Md.

[73] Assignee: W. R. Grace & Co.-Conn., New York, N.Y.

[ * ] Notice: The portion of the term of this patent subsequent to Apr. 5, 2005 has been disclaimed.

[21] Appl. No.: 85,330

[22] Filed: Aug. 14, 1987

Related U.S. Application Data

[63] Continuation of Ser. No. 843,347, Mar. 24, 1986, abandoned.

[51] Int. Cl.[4] .......................... H01M 4/60; H01M 4/62
[52] U.S. Cl. ...................................... 429/212; 429/217
[58] Field of Search ................................ 429/212, 217

[56] References Cited

U.S. PATENT DOCUMENTS

| | | | |
|---|---|---|---|
| 2,677,713 | 5/1954 | Weil et al. | 429/217 |
| 3,060,254 | 8/1959 | Urry . | |
| 3,099,586 | 9/1960 | Duddy . | |
| 3,184,339 | 4/1962 | Ellis . | |
| 3,351,495 | 11/1967 | Larsen et al. . | |
| 3,484,295 | 12/1969 | Dawson | 429/217 X |
| 3,898,099 | 8/1975 | Baker et al. . | |
| 3,918,989 | 11/1975 | Gillman et al. | 429/215 X |
| 4,091,176 | 5/1978 | Alfenaar . | |
| 4,124,747 | 11/1978 | Murer et al. . | |
| 4,160,747 | 7/1979 | Schneider et al. | 429/217 X |
| 4,169,816 | 10/1979 | Tsien . | |
| 4,223,080 | 9/1980 | Auborn . | |
| 4,320,185 | 3/1982 | Bernstein et al. | 429/217 |
| 4,322,317 | 3/1982 | Rao et al. . | |
| 4,339,512 | 7/1982 | Witherspoon et al. | 429/217 X |
| 4,550,064 | 10/1985 | Yen et al. . | |
| 4,562,113 | 12/1985 | Yonahara et al. . | |
| 4,601,919 | 7/1986 | Asami et al. | 429/217 X |
| 4,735,875 | 4/1988 | Anderman et al. | 429/217 X |

OTHER PUBLICATIONS

NASA Technical Brief, vol. 9, No. 2, Item 103 (Summer 1985).
Electrochemica Acta vol. 29, No. 11, pp. 1589–1596, (1984).
J. Electrochem Soc. pp. 656–660 (May 1974).
J. Electrochem. Soc. pp. 1107–1109 (May 1983).
U.S. application Ser. No. 749,597 Filed Jun. 27, 1985 Entitled: Cathode Including a Non Fluorinated Linear Chain Polymer as the Binder, Method of Making the Cathode, and Lithium Electrochemical Cell Containing the Cathode.

*Primary Examiner*—Stephen J. Kalafut
*Attorney, Agent, or Firm*—Howard J. Troffkin

[57] ABSTRACT

A polymer bonded sheet product suitable for use as a cathodic electrode in a non-aqueous battery system wherein the cathodic electrode is a microporous sheet composed of from 2–30 weight percent polyethylene, 70–98 weight percent of electrically conductive and electrochemically active particulate material and from 0 to 5 weight percent of a plasticizer for the polyethylene.

29 Claims, No Drawings

CATHODIC ELECTRODE

This is a continuation of application Ser. No. 843,47, filed Mar. 24, 1986, now abandoned.

BACKGROUND OF THE INVENTION

The present invention is directed to polymer bonded electrodes useful in a non-aqueous battery and to a battery system containing said electrodes.

Storage batteries have a configuration composed of at least one pair of electrodes of opposite polarity and, generally, a series of adjacent electrodes of alternating polarity. The current flow between electrodes is maintained by an electrolyte composition capable of carrying ions across electrode pairs.

Non-aqueous batteries have certain distinct advantages over other types of storage batteries. They use, as anodes, light weight or alkali metals, such as lithium, lithium-aluminum alloys and the like which are at the far end of the electromotive series. These batteries have the potential for providing much higher gravimetric and volumetric energy densities (capacity per unit weight and volume, respectively) than other types of batteries, due to the low atomic weight of the metal and high potential for forming a battery in conjunction with suitable positive electrodes far removed from the light weight (alkali) metal electrode (the description herein will use batteries having lithium as the light weight metal anode although other light weight metals can be used) in the electromotive series. The battery can be formed in any conventional physical design, such cylindrical, rectangular or disc-shaped "button" cells, normally of a closed cell configuration.

The battery components of positive electrode, negative electrode and separator can be in the form of distinct alternating plates in a sandwich design or of a continuous spirally wound design as are well known. The anodic electrodes can be formed, for example, from lithium metal or its alloys on a support, such as a nickel coated screen. The electrolyte can be formed of a non-aqueous solvent or fused or solid electrolyte. Illustrative of known useful non-aqueous solvents include acetonitrile, tetrahydrofuran and its derivatives, propylene carbonate, various sulfones and mixtures of these solvents containing a light metal salt such as lithium salts as, for example, lithium perchlorate, iodide or hexafluroarsenate and the like. An additional, normally passive component of the battery is a separator membrane located between plates of opposite polarity to prevent contact between such plates while permitting electrolytic conduction. Separators are normally of the form of sheets which possess very low electronic conductivity.

Significant developments have been made in the fabrication of non-aqueous batteries. However, one of the major concerns is the lack of development of a suitable cathode in which the electrochemically cathodic material is present in the form of a porous, flexible, sheet material. The cathodic active material must be bonded into a unitary sheet by a material which is inert with respect to the other components of the battery as well as being inert and compatible to the active material. The bonding material must be capable of readily forming a uniform sheet. The resultant sheet must have the active material uniformly distributed throughout the length and breadth of the sheet as well as across its thickness to provide maximum effectiveness. The bonding material must be kept to very low amounts of the total sheet material or the cathodic active material will be encompassed by the material and thereby dramatically reduce the conductivity and activity of the resultant cathodic sheet product. Even though present in only small amounts the bonding polymer must be capable of maintaining the sheet integrity and provide resistance to fractures, spalling and disintegration attributable to the expansion and contraction forces encountered in charge-discharge cycling.

Polymer bonded electrodes presently known have a number of deficiencies which has limited their utility and, thereby limited the acceptance of an effective non-aqueous battery system. The presently known polymer-bonded electrodes are not capable of being mass produced by a reliable, cost-effective, non-aqueous process. In addition, the majority of known polymer-bonded electrodes exhibit flaking and disintegration when the formed sheet is further processed such as when applied to a current collector and/or during assembly into a battery.

A number of bonding polymers have been considered for and used in the fabrication of cathodic polymer bonded electrodes. The most widely used material at the present time is poly(tetrafluoroethylene), commonly referred to as PTFE or by the tradename Teflon. PTFE bonded electrodes have certain drawbacks which limit their usefulness and ability to provide a highly effective product. For example, the chemical inertness of this polymer causes the fabrication of electrodes to be both difficult and laborious. Generally, it requires initially mixing the active material with an aqueous slurry of PTFE which is then doctored onto a surface and heated to high temperatures (250°-400° C.) to remove the water and cause bonding. The presence of water and the processing at high temperatures limits the active materials which can be used in forming the electrode product. For example, certain chalcogenides are known to be unstable in the presence of water. PTFE bonded sheets tend to flake and are not free standing unless large amounts of polymer are used. The sheets are conventionally bonded to a current collector screen by pressing them together at high temperatures. This process normally produces a brittle product which tends to crack and chip. Finally, a major defect of this known class of product is its non-uniformity both in distribution of active material and of porosity. This defect is inherently due to the processing techniques required, especially the evaporation of solvent from the materials causing non-uniformity across its thickness as well as from point-to-point on the sheet product. Patents illustrating formation of polymer bonded electrodes by this technology are U.S. Pat. Nos. 3,457,113; 3,407,096; and 3,306,779.

Some work has been done to form a product from dry tetrafluoroethylene suspensions to overcome the incompatibility problems associated with water but such products require sintering at very high temperatures (e.g. 400° C.) which also limits the types of active fillers which can be used. Patents illustrating this known technology are U.S. Pat. Nos. 3,184,339 and 3,536,537.

More recently polymer bonded electrodes have been formed from slurries of EPDM (ethylene-propylenediene terpolymer) in an organic medium, such as cyclohexane (see "Elastomic Binders for Electrodes" by S. P. S. Yen et al., J. Electrochem. Soc., Vol. 130, No. 5, Pg. 1107). Other elastomeric polymers, such as sulfonated ionomers, butyl rubbers and the like have also been used in forming electrodes by a slurry technique (See U.S.

Pat. No. 4,322,317). The resultant electrode products formed in this manner exhibit greater elasticity and compatibility with the other battery components. However, the defects of non-uniformity of product, poor control of porosity and pore size distribution remain a problem. In addition, electrodes made by this method exhibit severe loss of activity after being subjected to only a few charge/discharge cycles as noted by the low figure of merit reported in U.S. Pat. No. 4,322,317.

It is highly desired to be able to provide a polymer bonded electrode which is capable of being readily fabricated without being labor intensive. Further, it is desired to provide a polymer-bonded electrode which can be formed with a very high content of electrochemically active particulate material, can exhibit a high degree of uniformity, is a flexible material which can be readily formed into desired configuration and can maintain its integrity under the conditions encountered in a battery (including expansion-contraction of cycling). Finally, it is highly desired to provide a polymer-bonded electrode which is in the form of a sheet of controlled microporosity capable of permitting entry and mobility of electrolyte therein which can thereby increase the electrode's activity.

Upon initial consideration, it might be assumed that many binding materials could be used as alternatives to the small number of materials presently used and obtain the desired results. However, although there are a large number of polymers available as binders in many applications including as electrode binders, a selection of a specific binder is not obvious to the artisan when attempting to provide a chalcogenide filled cathodic electrode because of the many factors which influence the results one obtains with any particular binder. Among the major factors which influences the results obtained are: (1) the solubility of the binder in the organic electrolytes which are required in this application; (2) the chemical stability of the polymer at the electrode potential realizing that many cells are operated at different potentials; (3) the stability of the electrochemically active and electrically conductive materials used in combination with a particular binder and under the conditions needed for fabrication; (4) the ability of the polymer to bind the particulate material into a unitary structure at very low concentrations in order to provide a cathodic electrode with good performance; (5) the ability and ease of obtaining a uniform distribution of the binder with the active material of the electrode; (6) the ability of the polymer to maintain a stable cathodic electrode capable of undergoing a multiplicity of charge-discharge cycling; (7) the number and ease of the steps required to obtain the desired cathodic electrode; and (8) the safety, availability of material and cost. Thus, selection of a polymer for use in forming a high performance electrode containing metal chalcogenides has been a difficult task because of the above factors which impose severe restrictions and limitations.

It has now been discovered that a cathodic polymer bonded electrode suitable for use in non-aqueous batteries can be readily formed in a manner which provides a superior electrode and overcomes the processing problems associated with Teflon and other presently used polymers as described above.

SUMMARY OF THE INVENTION

The present invention is directed to a polymer bonded electrode and to a non-aqueous battery system containing said electrode product in which the electrode is a thin, microporous sheet composed of from 2-30 weight percent polyethylene, 70-98 weight percent of particulate material composed of electrochemically active and electrically conductive materials and from 0-5 weight percent of an organic plasticizer for the polyethylene. The sheet is prepared by forming a substantially uniform mixture of the components with from 20 to 60 volume percent excess of plasticizer, shaping the mixture into a sheet and extracting substantially all of the plasticizer therefrom. The resultant product is a flexible sheet material which possesses a high degree of mechanical integrity, strength and uniformity, has a controlled pore volume with pore size of narrow distribution and exhibits high conductivity of at least 0.1 reciprocal ohm-cm and preferably at least 0.3 reciprocal ohm-cm.

The polymer bonded electrode product formed according to the present invention is capable of exhibiting high degree of activity even after subjection to a large number of charge/discharge cycles.

DETAILED DESCRIPTION OF THE INVENTION

The polymer bonded electrode product of the present invention is in the form of a thin sheet which is required to be formed from a homogeneous admixture of polyethylene, a plasticizer for the polyethylene, and particulate material having a combination of electrochemical active and electrically conductive properties as are described herein below.

The polymer electrode product of the instant invention is formed through a series of precursor materials. Generally, a uniform admixture is initially formed of polymer, plasticizer and particulate material. The admixture is capable of exhibiting sufficient flow and rheological characteristics to permit the admixture to be readily processed and shaped at relatively low temperatures (i.e. 25° C.–170° C.). An initial sheet is formed from the admixture. The plasticizer component is then removed from the initial sheet. This removal normally occurs subsequent to the forming of a laminate in which a metal screen (a current collector) is laminated to a sheet or sandwiched between two sheets to provide an electrode product. The final electrode product, having had the plasticizer component substantially removed, is a highly filled (normally 85 wt. % or greater) product useful as a polymer bonded electrode.

The present invention requires the utilization of polyethylene of high density. The polyethylene should have a weight average molecular weight of at least about 150,000 and is preferably selected from higher molecular weights such as from about 200,000 to 5,000,000. The most preferred polyethylenes are homopolymers of high molecular weight such as of a weight average molecular weight of 200,000 to 500,000. Although homopolymers are preferred the term "polyethylene", as used herein and in the appended claims, shall mean polyethylene homopolymers and copolymers in which copolymer is formed from olefinic monomers such as ethylene, propylene, butene-1, acrylate and the like with the major (preferably at least 80 percent) olefinic monomer being ethylene.

The polymer component used in forming the subject electrode product can be comprised of a mixture of a high molecular weight polyethylene and a low molecular weight polyethylene. The mixture can be formed from about 5–95 weight percent of a high molecular weight polymer and a corresponding 95–5 weight percent of a low molecular weight polymer. The term "high molecular weight polymer" is intended to refer to a polymer having a weight average molecular weight of at least 250,000 and "low molecular polymer" refers to a polymer having a weight average molecular weight of from about 100,000 to 250,000.

The plasticizer of the instant composition must be present in the initial formulating and processing to form an initial sheet product, as more fully described below. The plasticizer provides the means of fabricating the composition to a uniform consistency and to aid in inducing and controlling the degree of porosity, the pore size distribution and uniformity of porosity throughout the resultant sheet product.

Plasticizers suitable for the instant invention are compounds which are capable of plasticizing polyethylene, are substantially inert with respect to the particulate material used herein, and are substantially soluble in an organic solvent which is a non-solvent with respect to the polymer component described above and the particulate material described below which are used in forming a particular composition. Representatives of such plasticizers are organic esters, such as sebacates, phthalates, stearates, adipates and citrates; epoxy compounds such as epoxidized vegetable oil; phosphate esters such as tricresyl phosphate; hydrocarbon materials such as petroleum oil including lubricating oils and fuel oils, hydrocarbon resin and asphalt and pure compounds such as eicosane; coumarone-indene resins and terpene resins; tall oil and linseed oil. The preferred plasticizers are hydrocarbon materials and most preferred plasticizers are selected from petroleum oils. The plasticizer is generally substantially free of water (anhydrous) and, therefore, compatible with the subject battery system.

The organic plasticizer used herein aids in fabricating the sheet product and in imparting microporosity to the resultant sheet. The void volume of the resultant sheet will be directly dependent upon the amount of plasticizer used to form the initial composition and the amount of plasticizer extracted to provide the final sheet product. Void volumes of the final sheet product may range from about 15 volume percent to about 60 volume percent with from about 25 to 40 volume percent being preferred. Higher ranges are normally acceptable for sheet products having higher cross-sectional dimensions. The sheets void volume is of a microporous character which generally have narrow distribution and are of low mean diameter (i.e. 0.05 to 0.5 microns) and can be determined by standard mercury intrusion techniques.

The particulate material required in forming the present admixture and the resultant sheet is composed of the cathodic electrochemically active and electrically conductive materials. They must be in particulate form. Smaller particle size material (such as a mean particle size of about 25 microns or less and preferably less than 10 microns) is preferred to enhance intimate contact between the particles of electrochemically active material contained in the resultant electrode. The term "electrochemically active" refers herein and in the appended claims to the ability of a material to enter and participate in a redox reaction during the operation and in the environment of an electrochemical cell. The term "electrically conductive" refers herein and in the appended claims to the ability of a material to exhibit low resistance to electron transfer. The particulate material used herein will normally require a mixture of materials selected from the chalcogenide compounds described below and from electrically conductive diluent also described below. The combination of materials should be such as to provide an electrode sheet product capable of exhibiting an overall conductivity of at least about 0.1 reciprocal ohm-cm. When the cathodically-active material has low electrical conductivity (the majority of the chalcogenide exhibit less than about 0.001 reciprocal ohm-cm) they will be used in combination with conductive diluent as described below.

The particulate material can be one or more of the chalcogenide compounds selected from sulfides, oxides, selenides, and tellurides of zirconium, hafnium, niobium, copper, iron, tantalum, chromium, and vanadium. In general, such chalcogenides contain about 1.8 to about 3.2 atoms of the chalcogen per metal atom. Advantageously, when forming a secondary battery the cathodic electrode is preferably selected from a chalcogenide of vanadium and most preferably a mixed oxide of vanadium. When forming a primary battery the preferred chalcogenides are formed from vanadium, such as $V_2O_5$, iron and copper especially the sulfides of iron and copper. Also, among the chalcogenides, those which contain about 1.8 to about 2.1 atoms of chalcogen per metal atom, commonly referred to as the dichalcogenides, are preferred.

Examples of cathode-active materials which may be useful and which are selected from the above-mentioned chalcogenides are zirconium disulfide, hafnium disulfide, niobium triselenide, tantalum disulfide, vanadium disulfide, vanadium diselenide and vanadium ditelluride as well as vanadium oxide such as $V_3O_8$ and $V_5O_{13}$. Also included are the chalcogenides having more than one of the mentioned metals, e.g., $V_{0.25}Ti_{0.75}S_{2.0}$. Also included are those chalcogenides having metals other than those described above included, e.g., vanadium iron disulfide. Lastly, it should be noted that while the trichalcogenides and dichalcogenides are described, the present invention is not limited thereto and may include, for example, the pentachalcogenides and the like.

The particulate material may further comprise minor amounts (up to about 30 weight percent) of conductive diluent such as high surface area conductive carbon black. The diluent is normally of ultrafine particle size of from about 1 to 100 millimicrons and have a (BET) surface area of at least 40 $m^2/g$ and preferably from 70 to 2000 $m^2/g$. The carbon can serve several roles to enhance the subject electrode. In instances where the particulate chalcogenide used has good electronic conductivity, the carbon merely acts as an electrical conductive bridge between particles of chalcogenide to further enhance the total properties of the resultant electrode. Where the chalcogenide has poor electronic conductivity i.e. $V_2O_5$ (high resistance) the conductive diluent provides a means for carrying the electron to the current collector from the electrochemically active chalcogenide site.

In addition to the above described components, the initially formed admixture may further contain conventional stabilizers, antioxidants, wetting agents, processing aids or mixtures thereof. Representative of stabilizers are 4,4-thiobis(6-tertbutyl-m-cresol) sold commercially under the tradename "Santonox" and 2,6-ditertbutyl-4-methylphenol sold commercially under the tradename "Ionol". Examples of known commercially available wetting agents include sodium alkyl benzene sulfonate, sodium lauryl sulfate, dioctyl sodium sulfosuccinate, and isooctyl phenyl polyethoxy ethanal. Processing aids include stearates, graphite and the like.

The above-described components can be readily formed into a substantially homogeneous admixture. The initial admixture should be formed by blending from about 5 to 35 (preferably 5–20) volume percent polymer, from about 25 to 75 (preferably 40 to 60) volume percent of particulate material and from about 20 to 50 volume percent of polymeric plasticizer.

The blending of the components can be readily accomplished by conventional means such as by initially mixing at room temperature in a blender and then in a Banbury, Brabender or sigma blade mixer or the like at moderate (about 25° to about 170° C., preferably from about 120° to about 160° C.) temperatures. The blending and processing is preferably done under dry conditions to avoid water pick-up by the materials.

It has been found that extremely high particulate content admixtures required by the present invention exhibit rheological properties which permit them to be readily shaped and formed into thin sheet products of less than about 50 mils, preferably less than about 20 mils. It must be understood that the particular thickness can be customized by the artisan based on the battery design and its acceptable drain rate. Sheet products and electrodes therefrom can be made of less than 5 mils and even less than 3 mils thickness. Sheet products made by presently known conventional techniques can not be formed of such thin dimensions and maintain good mechanical properties as is attainable by sheet products of the present invention. The term "sheet" as used herein and in the appended claims refers to a shaped product having extensive length and breath dimensions and of thin cross-section and which may have major surfaces which are substantially flat or of a predetermined design. The initial sheet product can be readily formed from the admixture by subjecting the admixture to extrusion, calendering, injection molding or compression molding processing. All of these processing means are capable of producing the initial sheet in large volume using low labor involvement. The most preferred method is extrusion of the admixture using a conventional extrusion apparatus to continuously provide initial sheet product.

The forming of the initial sheet (a sheet having high levels of plasticizer therein) car be readily accomplished at moderate operating conditions, including low temperatures of from about 25° to 175° C. and preferably from about 120° to 160° C. Such temperatures allow formation of sheet product using components normally deemed unsuitable under known slurry processes. Further the present process provides a sheet which is free standing and has substantial uniform distribution of particulate material throughout its length and breadth dimensions as well as across its cross-sectional dimension.

The initially formed sheet can be readily made into a suitable cathodic electrode by laminating a conventional current collector with at least one sheet of the present invention. The plasticizer component can be extracted, as described below, prior or subsequent to lamination with the current collector. It is preferred to initially form the laminate structure of at least one sheet with a suitable current collector and then extract the plasticizer material.

The current collector is normally a screen, grid, expanded metal, woven or non-woven fabric or the like formed from efficient electron conductive materials such as carbon, or metals such as copper, aluminum, nickel, steel, lead, iron or the like. The current collector, when laminated to the final sheet product (a sheet substantially comprising particulate material bonded by very low amounts of polyethylene) of the present invention, provides a low electronic resistance path between the active material and the battery terminal.

The sheet product, with or without the presence of plasticizer, is a pliable and moldable material which can be readily laminated to the collector screen by concurrently passing a screen and at least one sheet through a set of nip rollers or the like to press (under low pressure and preferably at moderate temperatures of about 25° to 170° C.) to produce a laminate product. It is preferred that the laminate be of a configuration of a screen sandwiched between (and thereby embedded in) two sheets although a laminate of a single sheet and single screen may be desired in certain applications. The laminate can be most readily formed by utilizing an initial sheet product immediately after its production to utilize the sheet in its elevated temperature state.

The plasticizer contained in the initial formed sheet should be substantially completely removed by means of extraction using suitable solvent. The composition of the resultant electrode will depend upon the degree of extraction of the plasticizer. The plasticizer can be substantially completely removed, leaving a microporous polymeric sheet product which is highly filled with cathodic active material. The resultant sheet product exhibits good physical properties and a high degree of microporosity. The exact degree of microporosity is induced and regulated to a large degree by the amount of plasticizer used and extracted. The microporosity character of the resultant polymer bonded electrode provides a means to permit the electrolyte to be in intimate contact with a very high percentage of the particulate material. It is believed, although not meant to be a limitation on the present invention, that the microporous structure of the sheet permits the particles residing in the interior of the sheet to be more active.

The procedure for extraction of the plasticizer from a sheet product is well known and is not meant to form a part of the present invention, per se. A single stage extraction can be used. The solvent or extraction conditions should be chosen so that the polyolefin and particulate material are essentially insoluble. For example, when petroleum oil is to be extracted from the formed sheet, the following solvents are suitable; chlorinated hydrocarbons, such as trichloroethylene, tetrachloroethylene, carbon tetrachloride, methylene chloride, tetrachloroethane, etc., as well as hydrocarbon solvents such as hexane, benzene, petroleum ether, toluene, cyclohexane, gasoline, etc. Generally, aqueous solvents should not be used as these would attack most of the required filler components.

The extraction temperature can range anywhere from room temperature up to the melting point of the polyolefin as long as the polyolefin does not dissolve. The temperature can be maintained such that all components remain stable and are not adversely effected.

The time of the extraction will vary depending upon the temperature used and the nature of the plasticizer or filler being extracted. For example, when a higher temperature is used, the extraction time for an oil of low viscosity can be a very short time of up to only a few minutes, whereas if the extraction is performed at room temperature, the time requirement will be greater.

The final composition of the polymer-bonded electrode sheet product will depend upon the original composition and the degree of extraction of the plasticizer from the sheet product. The extracted sheet normally has from about 2 to 30 weight percent polyethylene, about 70 to 98 weight percent particulate material, and from about 0 to 5 weight percent plasticizer. The more preferred electrode comprise a mixture of from 4 to 15 weight percent polyolefin, 85 to 96 weight percent particulate material, and from 0 to 3 weight percent plasticizer.

In a preferred embodiment, 12 volume percent polyethylene, 53 volume percent particulate material, and 35 volume percent plasticizer are blended together, extruded to provide a flat sheet and then sufficient plasticizer is extracted to provide a finished electrode sheet composed of 18 volume percent polyolefin, 81 volume percent particulate material, and 1 weight percent plasticizer.

The porosity volume percents or void volume percent were calculated for the resultant sheet product by calculating the wet weight minus dry weight divided by the sheet product's geometric wet volume.

Charge/Discharge cycling was performed on cells having the subject sheet using a Princeton Applied Research Model 363 galvanostat. The galvanostat was powered and monitored with an Analog Devices μMAC 5000 microcomputer which controlled the current passing through the cell and measured the current passing through the cell and measured the current voltage and charge throughout the cycle.

The electrical conductivity of the resultant sheet products were measured with a Yellow Spring Instrument Conductivity Bridge at 1 KHz by placing a nickel metal clamp on each of the two opposite ends of the specimen to be tested in such a manner as to have a free sample spacing of 1 cm by 1 cm not covered by the clamps. The thickness of the samples were measured. The clamps were connected to a conventional conductivity bridge and the resistance of the samples were measured. To check the accuracy of the measurements, the clamps were adjusted to a spacing of 2 cm by 1 cm and the resistance remeasured.

The following examples are given for illustrative purposes only and are not meant to be a limitation on the subject invention, except as made in the claims appended hereto. All parts and percentages are by weight unless otherwise indicated.

EXAMPLE 1

Eight parts of high density polyethylene of a weight average molecular weight of 250,000 were mixed with 22 parts of hydrocarbon oil (Sunthene 255; density of 0.89 g/ml, 54 ssu at 210° F., flash point of 390° F.), 19 parts of Shawinigan processed carbon black (acetylene black, 50% compressed density of 2.1 gm/cc, 70 m$^2$/gm BET surface area) 3 parts of graphitic carbon (density of 2.1 gm/cc, <5 m$^2$/gm BET surface area) and 54 parts of minus 200 mesh $V_2O_5$ (Cerac). The mixture was placed in a Brabender blender maintained at a temperature of 150° C. and mixed for about 5 minutes until steady torque is obtained. A dry nitrogen atmosphere was maintained over the equipment.

A sample of the resultant composition was hot pressed at a pressure of about 250 psi at a temperature of 150° C. for approximately 10 seconds to produce a uniform sheet of 18 mil thickness. The formed sheet was then immersed in cyclohexane for 3 periods of 10 minutes each to yield a microporous sheet having 36 percent void volume substantially uniformly distributed throughout. The composition of the extracted, microporous sheet was 9.5 percent polyethylene, 26.2 percent combined particulate carbon, 64 percent $V_2O_5$ and less than 1 percent oil. The electronic conductivity of the microporous sheet measured at 22° C. and 1 KH2 was 0.11 ohm$^{-1}$ cm$^{-1}$.

EXAMPLE 2

A cathodic electrode was formed with the composition of Example 1 above and the electrode was used as part of a Li-$V_2O_5$ battery cell. Two sheets (approx. 3 mils each) were formed by pressing samples of the composition of Example 1 above at 150° C. and 250 psi. The sheets were placed on each side of an expanded nickel metal screen and the composite subjected to pressure of 250 psi at 150° C. for approximately 10 seconds to produce a product having the screen embedded therein. An examination of the product showed that the polymeric sheets had formed into a single unitary structure. The product was immersed in cyclohexane bath for 3 periods of 10 minutes each to yield a microporous polymer bonded electrode product. The electrode was then dried at 10–20 microns vacuum and 80° C. for 2 hours to remove residual amounts of solvent. The formed cathodic electrode was placed in an Argon atmosphere glove box for assembly as part of a cell with a lithium foil of 1 cm$^2$ and 5 mil thickness which had been pressed onto a commercially available expanded nickel metal grid. The two electrodes were placed into a rectangular glass tubing using a commercial polypropylene microporous sheet separator between the electrodes. The cell was filled with 0.5 ml 1.2M LiAsF$_6$ in 2-methyltetrahydrofuran. The cell was then temporarily sealed with an O ring, taken out of the glove box and permanently glass sealed in a flame.

The cell contained 13.1 mg $V_2O_5$ which is equivalent to a theoretical capacity of 4.1 mAh (assuming the discharged material is Li$_2$L $V_2O_5$). The cell was discharged at 1 mA to a cutoff voltage of 1.80 volts and charged at 0.5 mA to a cutoff voltage of 3.0 volts. Capacity utilization at 1 mA was 100% for Cycle #1, 65% for Cycle #3, 37% for Cycle #14 and 36% for Cycle #30. Because of the high theoretical capacity of this $V_2O_5$ electrode system, the charge density was still very high even at the relatively low capacity percentage obtained.

EXAMPLE 3

Eight parts of high density polyethylene of a weight average molecular weight of 250,000 were mixed with 22 parts of hydrocarbon oil (Sunthene 255; density of 0.89 g/ml, 54 ssu at 210° F., flash point of 390° F.), 19 parts of Shawinigan processed carbon black (acetylene black, 50% compressed, 3 parts graphitic carbon and 65 parts of FeS$_2$ (Cerac; minus 100 mesh, 99.9 percent purity). The mixture was processed in the same manner as described in Example 1 above. The composition of the formed sample of extracted microporous sheet product was: 8 percent polyethylene, 27 percent combined carbons and 65 percent FeS$_2$. The oil content was negligible. The electronic conductivity of the formed microporous sheet measured at 1 KHZ and 22° C. was 0.6 ohm$^{-1}$ cm$^{-1}$.

A Li-FeS$_2$ cell was fabricated by the same procedure as described in Example 2 above using the polymer FeS$_2$ composition of this example. The cell contained 12.9 mg of FeS$_2$ (active) material, a 5 mil Li foil and approximately 0.5 ml of an electrolyte solution composed of 1M LiClO$_4$ in propylene carbonate. The cell was tested by conventional charge-discharge cycling procedure discharged at 1 mA to a cutoff voltage of 1 volt and charged at 0.25 mA to a voltage limit of 2.5 volts. The cell delivered 7 mAh in Cycle #1, 5.3 mAh in Cycle #4, and 3.9 mAh in Cycle #6. The theoretical capacity based on 2 electrons per iron atom is 5.8 mAh.

EXAMPLE 4

The procedure described in Example 3 above was repeated except that the amount of carbon black was reduced to 18 parts and the amount of FeS$_2$ was increased to 80 parts. The formed extracted sheet was composed of 7 percent polyethylene, 19 percent combined particulate carbons, 73 percent FeS$_2$ and less than 1 percent oil. The electronic conductivity of the sheet, measured at 1 KHz and 22° C. was 0.4 ohm$^{-1}$ cm$^{-1}$. A FeS$_2$ electrode was made according to the procedure of Example No. 2 and a Li-FeS$_2$ cell was fabricated as described in Example No. 3. This cell contained 15.3 mg of FeS$_2$. The cell was discharged at 1 mA, and charged at 0.5 mA to 2.5 volts. The cell delivered 3.8 mAh to 1.3 volts over 5 charge/discharge cycles.

EXAMPLE 5

The procedure of Example 1 was repeated using a mixture of components composed of 9 parts of high-density polyethylene of weight average molecular weight of 250,000, 21 parts hydrocarbon oil (Sunthene 255) and 104 parts of CuS (Cerac; minus 200 mesh, 99.5 percent purity). The formed extracted microporous sheet was composed of about 8 percent polyethylene, 92 percent CuS and residual oil. Conductivity of the sheet, measure at 1 KHz and 22° C. was 3.3 ohm$^{-1}$ cm$^{-1}$.

A Li-CuS cell was fabricated using the material of this Example according to the procedure described in Example 2. The cell which contained 18.6 mg of CuS was discharged at 2 mA to 1.3 V and charged at 1 mA to 2.5 V. The maximum capacity obtained on discharge was 5.4 mAh which is equivalent to 1.03 Li ions per copper atom.

We claim:

1. A cathodic electrode suitable for use in a non-aqueous battery system comprising at least one microporous sheet product formed from a substantially homogeneous composition consisting essentially of from about 70–98 weight percent of electrochemically active and electrically conductive particulate material composed of at least one metal chalcogenide having a metal selected from titanium, zirconium, hafnium, niobium, copper, iron, tantalum, molybdenum, vanadium, manganese and mixtures of said metals, said particulate material includes up to about 30 weight percent thereof of a conductive carbon black having an average particle size of from about 1 to 100 millimicrons; from about 2–30 weight percent of high density polyethylene having a weight average molecular weight of from about 150,000 to 5,000,000; and from 0 to about 5 weight percent of an organic plasticizer for said polyethylene; and a current collector composed of a conductive material, said collector being intimate contact with each of said at least one microporous sheet product.

2. The electrode of claim 1 wherein the current collector is in the form of a screen, grid, expanded metal, foil or woven or non-woven fabric formed from carbon or a conductive metal and wherein said sheet product has a void volume which is microporous and of from about 15 to 60 volume percent, a thickness of less than about 50 mils and the metal chalcogenide particle size is about 25 microns or less.

3. The electrode of claim 1 wherein the polyethylene has a weight average molecular weight of from about 200,000 to about 500,000.

4. The electrode of claim 2 wherein the polyethylene has a weight average molecular weight of from about 200,000 to about 500,000.

5. The electrode of claim 1 wherein the polyethylene is composed of a major amount of a polyethylene having a weight average molecular weight of at least 250,000 and a minor amount of a polyethylene having a weight average molecular weight of from about 100,000 to 250,000.

6. The electrode of claim 2 wherein the polyethylene is composed of a major amount of a polyethylene having a weight average molecular weight of at least 250,000 and a minor amount of a polyethylene having a weight average molecular weight of from about 100,000 to 250,000.

7. The electrode of claim 1 composed of two sheet products and having the current collector therebetween; said sheet products fused together to form a substantially unitary structure.

8. The electrode of claim 2 composed of two sheet products and having the current collector therebetween; said sheet products fused together to form a substantially unitary structure.

9. In a secondary non-aqueous battery comprising at least one pair of electrodes composed of an anodic electrode and a cathodic electrode, and a non-aqueous electrolyte composition, said anodic electrode formed from an alkali metal or alkali metal alloy wherein the improvement comprises having the cathodic electrode consists essentially of the product of claim 1 in which the metal of the metal chalcogenide contained therein is selected from titanium, zirconium, hafnium, niobium, tantalum, molybdenum, vanadium or mixtures thereof.

10. In a secondary non-aqueous battery comprising at least one pair of electrodes composed of an anodic electrode and a cathodic electrode, and a non-aqueous electrolyte composition, said anodic electrode formed from an alkali metal or alkali metal alloy wherein the improvement comprises having the cathodic electrode consists essentially of the product of claim 2 in which the metal of the metal chalcogenide contained therein is selected from titanium, zirconium, hafnium, niobium, tantalum, molybdenum, vanadium or mixtures thereof.

11. In a secondary non-aqueous battery comprising at least one pair of electrodes composed of an anodic electrode and a cathodic electrode, and a non-aqueous electrolyte composition, said anodic electrode formed from an alkali metal or alkali metal alloy wherein the improvement comprises having the cathodic electrode consists essentially of the product of claim 3 in which the metal of the metal chalcogenide contained therein is selected from titanium, zirconium, hafnium, niobium, tantalum, molybdenum, vanadium or mixtures thereof.

12. In a secondary non-aqueous battery comprising at least one pair of electrodes comprised of an anodic electrode and a cathodic electrode, and a non-aqueous electrolyte composition, said anodic electrode formed from an alkali metal or alkali metal alloy wherein the improvement comprises having the cathodic electrode consists essentially of the product of claim 5 in which the metal of the metal chalcogenide contained therein is selected from titanium, zirconium, hafnium, niobium, tantalum, molybdenum, vanadium or mixtures thereof.

13. In a secondary non-aqueous battery comprising at least one pair of electrodes composed of an anodic electrode and a cathodic electrode, and a non-aqueous electrolyte composition, said anodic electrode formed from an alkali metal or alkali metal alloy wherein the improvement comprises having the cathodic electrode consist essentially of the product of claim 7 in which the metal of the metal chalcogenide contained therein is selected from titanium, zirconium, hafnium, niobium, tantalum, chromium vanadium or mixtures thereof.

14. In a primary non-aqueous battery comprising at least one pair of electrodes composed of an anodic electrode and a cathodic electrode and a non-aqueous electrolyte composition, said anodic electrode formed from an alkali metal, wherein the improvement comprises having a cathodic electrode consisting essentially of the product of claim 1 in which the metal of the metal chalcogenide contained therein is selected from vanadium, iron, copper, manganese or mixtures thereof.

15. In a primary non-aqueous battery comprising at least one pair of electrodes composed of an anodic electrode and a cathodic electrode and a non-aqueous electrolyte composition, said anodic electrode formed from an alkali metal, wherein the improvement comprises having the cathodic electrode consists essentially of the product of claim 2 in which the metal of the metal chalcogenide contained therein is selected from vanadium, iron, copper, manganese or mixtures thereof.

16. In a primary non-aqueous battery comprising at least one pair of electrodes composed of an anodic electrode and a cathodic electrode and a non-aqueous electrolyte composition, said anodic electrode formed from an alkali metal, wherein the improvement comprises having the cathodic electrode consists essentially of the product of claim 3 in which the metal of the metal chalcogenide contained therein is selected from vanadium, iron, copper, manganese or mixtures thereof.

17. In a primary non-aqueous battery comprising at least one pair of electrodes composed of an anodic electrode and a cathodic electrode and a non-aqueous electrolyte composition, said anodic electrode formed from an alkali metal, wherein the improvement comprises having the cathodic electrode consists essentially of the product of claim 5 in which the metal of the metal chalcogenide contained therein is selected from vanadium, iron, copper, manganese or mixtures thereof.

18. In a primary non-aqueous battery comprising at least one pair of electrodes composed of an anodic electrode and a cathodic electrode and a non-aqueous electrolyte composition, said anodic electrode formed from an alkali metal, wherein the improvement comprises having a cathodic electrode consist essentially of the product of claim 7 in which the metal of the metal chalcogenide contained therein is selected from vanadium, iron, copper, manganese or mixtures thereof.

19. A microporous sheet product suitable for use in forming a cathodic polymer bonded electrode consisting essentially of:
(a) from 70–98 weight percent of particulate material composed of at least one metal chalcogenide having a metal selected from titanium, zirconium, hafnium, copper, iron, manganese, niobium, tantalum, chrombium, molybdenum, vanadium and mixtures of said metals, said particulate material includes up to about 30 weight percent thereof of a conductive carbon black having an average particle size of from about 1 to 100 millimicrons; and
(b) from about 2–30 weight percent of high density polyethylene having a weight average molecular weight of from about 150,000 to about 5,000,000; and
(c) from 0 to about 5 weight percent of an organic plasticizer for said polyethylene: said sheet having a void volume of at least about 10 volume percent and capable of exhibiting conductivity of at least about 0.15 reciprocal ohm-cm. when placed in an electrical circuit.

20. The sheet of claim 19 wherein the polyethylene has weight average molecular weight of from about 200,000 to about 500,000.

21. The sheet of claim 19 wherein the polyethylene is composed of a major amount of a polyethylene having a weight average molecular weight of at least 250,000 and a minor amount of a polyethylene having a weight average molecular weight of from about 100,000 to 250,000 and wherein said sheet product has a void volume which is microporous and of from abut 15 to 60 volume percent, a thickness of less than about 50 mils and the metal chalcogenide particle size is about 25 microns or less.

22. A sheet product useful as a battery electrode comprising a thin sheet formed from a homogeneous admixture consisting essentially of from 2 to 30 weight percent of polyethylene, from 70 to 98 weight percent of particulate material composed of at least one metal chalcogenide, the metal being selected from titanium, zirconium, hafnium, copper, iron, manganese, niobium, tantalum, chromium, molybdenum, vanadium and mixtures thereof or conductive carbon, and from 0 to 5 weight percent of a plasticizer for said polyethylene.

23. A cathodic electrode comprising a current collector composed of a conductive material in intimate contact with at least one sheet product of claim 22.

24. A microporous sheet product suitable for use as a cathodic polymer bonded electrode formed by
(a) blending into a substantially homogeneous admixture, a composition consisting essentially of (i) from about 5 to 35 volume percent high density high density polyethylene having a weight average molecular weight of from about 150,000 to about 5,000,000, (ii) from about 25 to 75 volume percent of particulate material composed of at least one metal chalcogenide having a metal selected from titanium, zirconium, hafnium, copper, iron, manganese, niobium, tantalum, chromium, molybdenum, vanadium and mixtures of said metals, said particulate material includes up to about 30 weight percent thereof of a conductive carbon black having an average particle size of from about 1 to 100 millimicrons; and (iii) from about 20 to 50 volume percent of organic material capable of plasticizing said polyethylene during formation of the sheet product;
(b) subjecting said admixture to extrusion, calendering, injection molding or compression molding to provide an initial sheet product;
(c) laminating at least one of said initial sheet product with a current collector composed of a conductive material; and
(d) extracting substantially all of the plasticizer component from the initial sheet product.

25. The microporous sheet product of claim 24 wherein extraction of plasticizer component from the initial sheet is conducted subsequent to laminating said at least one initial sheet to a current collector.

26. The microporous sheet product of claim 24 wherein said polyethylene has a weight average molecular weight of from about 200,000 to about 500,000.

27. The microporous sheet product of claim 24 wherein the current collector is a screen, grid, expanded metal, woven or non-woven fabric and the like formed from an efficient electron conductive material and wherein said sheet product has a void volume which is microporous and of from about 15 to 60 volume percent, a thickness of less than about 50 mils and the metal chalcogenide particle size is about 25 microns or less.

28. The microporous sheet product of claim 24 wherein said laminating is conducted with two initial sheet products and a current collector therebetween; said initial sheet products caused to fuse together to form a substantially unitary structure.

29. The microporous sheet product of claim 25 wherein said laminating is conducted with two initial sheet products and a current collector therebetween; said initial sheet products caused to fuse together to form a substantially unitary structure.

* * * * *